United States Patent [19]
Kuriki et al.

[11] Patent Number: 5,342,023
[45] Date of Patent: Aug. 30, 1994

[54] HYDRAULIC CONTROL DEVICE FOR ACTIVE SUSPENSION SYSTEM

[75] Inventors: Nobuharu Kuriki; Seiji Ohsaki; Hideaki Shibue; Yoshiki Noro, all of Saitama, Japan

[73] Assignee: Honda Giken Kogyo Kabushiki Kaisha, Tokyo, Japan

[21] Appl. No.: 925,987

[22] Filed: Aug. 6, 1992

[30] Foreign Application Priority Data

Aug. 6, 1991 [JP] Japan .................. 3-220986

[51] Int. Cl.⁵ .......................................... B60G 17/00
[52] U.S. Cl. .............................. 267/64.17; 267/64.16; 280/707
[58] Field of Search ............. 280/707, 714, 6.12, 280/840; 188/195, 299, 314; 267/64.16, 64.17, 218

[56] References Cited

U.S. PATENT DOCUMENTS

| | | | |
|---|---|---|---|
| 4,695,226 | 9/1987 | Marchitto et al. | 188/314 |
| 4,867,476 | 9/1989 | Yamanaka et al. | 280/714 |
| 4,958,850 | 9/1990 | Buma et al. | 280/714 |
| 4,973,080 | 11/1990 | Ikemoto et al. | 280/840 |
| 4,982,979 | 1/1991 | Akatsu et al. | 280/707 |
| 5,013,061 | 5/1991 | Fujimura et al. | 280/707 |
| 5,085,459 | 2/1992 | Sato et al. | 280/707 |

FOREIGN PATENT DOCUMENTS

| | | | |
|---|---|---|---|
| 3742883A | 6/1989 | Fed. Rep. of Germany | 280/714 |
| 62-1611 | 1/1987 | Japan . | |
| 132399 | 4/1950 | U.S.S.R. | 188/314 |
| 2227722 | 8/1990 | United Kingdom | 267/64.16 |

*Primary Examiner*—Robert J. Oberleitner
*Assistant Examiner*—Chris Schwartz
*Attorney, Agent, or Firm*—Irving M. Weiner; Joseph P. Carrier; Pamela S. Burt

[57] ABSTRACT

A hydraulic control device for an active suspension system employing a linear hydraulic cylinder including a piston connected in parallel with a spring between a wheel and a vehicle body, the piston having two pressure receiving surfaces of different areas facing two chambers separated by the piston in the cylinder, comprising a balancing valve for reducing the pressures of the two chambers to a level near the atmospheric pressure, a switch valve provided in a bypass passage between the two chambers for selectively communicating the two chambers with each other, a flow restricting orifice provided in the bypass passage; and an accumulator connected to the bypass passage capable of accommodating a change in the capacity of one of the chambers due to a piston rod extending from the piston out of the cylinder when the pressures of the two chambers are at the level near the atmospheric pressure. Alternatively, the accumulator could be replaced with a storage container connected to the bypass passage capable of accommodating an amount of actuating oil corresponding to a capacity of the cylinder. Thus, the active suspension system can serve as a workable passive suspension system when the supply of hydraulic oil is interrupted for any reason, and the reliability of the system can be improved.

16 Claims, 5 Drawing Sheets

5,342,023

HYDRAULIC CONTROL DEVICE FOR ACTIVE SUSPENSION SYSTEM

TECHNICAL FIELD

The present invention relates to a hydraulic control device for an active vehicle suspension system which connects a wheel with a vehicle body with a double acting type single rod cylinder capable of a reciprocating movement by means of hydraulic pressure.

BACKGROUND OF THE INVENTION

Conventionally, various types of active vehicle suspension systems have been proposed. An active vehicle suspension system actively controls a vertical relative movement between a wheel and a vehicle body as the vehicle travels on various kinds of road surfaces with a linear actuating force generated by hydraulic pressure. One such example is disclosed in a Japanese patent laid open publication No. 62-1611.

In the known hydraulic actuator used in the above mentioned active suspension system, a piston is slidably received in an enclosed cylinder so as to define two oil chambers above and below the piston, the piston facing the two oil chambers with corresponding pressure receiving surfaces having different areas, so that a certain thrust may be produced between the cylinder and the piston rod according to the difference in the areas of the pressure receiving surfaces even when the pressures supplied to the two oil chambers are equal to each other. The difference in the areas of the pressure receiving surfaces is typically accounted for by the cross sectional area of the piston rod.

Typically, a bottom of the cylinder is connected with a wheel while an end of the piston rod is connected with a vehicle body, and the output pressure from the pump is directly fed into the upper piston chamber. The pressure of the lower piston chamber is feedback controlled by a pressure control valve comparing it with a certain target value which is determined according to the change in the stroke and the output speed of the hydraulic actuator so that the height of the vehicle body can be kept at a certain constant level with the wheel following the contour of the road surface.

In the above mentioned hydraulic control device, it is desired that, even when the pump is not operative and hydraulic oil is not properly regulated, the active suspension system can function as a passive suspension system which can satisfy the minimum requirements of a suspension system.

It is conceivable to remove hydraulic oil from the hydraulic actuator of the active suspension system when the supply of hydraulic pressure thereto is discontinued so as to allow extending and retracting movement thereof, but the hydraulic actuator would be incapable of producing any damping force. It is also conceivable to communicate the upper and lower chambers of the hydraulic actuator with each other and keep the oil passage under a slightly pressurized condition. In this case, the change in the capacity of one of the pressure chambers caused by the piston rod displacing the hydraulic oil must be accounted for, and the hydraulic circuit must be kept at a relatively high level for an accumulation in the oil supply passage to be useful for such a purpose, and this creates a tendency to lift the vehicle body due to the difference in the areas of the two pressure receiving surfaces of the piston.

BRIEF SUMMARY OF THE INVENTION

In view of such shortcomings of the prior art, a primary object of the present invention is to provide a hydraulic control device for an active suspension system, in which the hydraulic actuator for the active suspension system can function at least as a passive damper when the active suspension system is made inoperative due to the loss of the supply pressure.

A second object of the present invention is to provide a hydraulic control device for an active suspension system which is simple in structure but is equipped with a reliable fail-safe feature.

These and other objects of the present invention can be accomplished by providing a hydraulic control device for an active suspension system employing a linear hydraulic cylinder including a piston connected in parallel with a spring between a wheel and a vehicle body, the piston having two pressure receiving surfaces of different areas facing two chambers separated by the piston in the cylinder, comprising: means for reducing the pressures of the two chambers to a level near the atmospheric pressure; switch valve means provided in a bypass passage between said two chambers for selectively communicating the two chambers with each other; flow restricting means provided in said bypass passage; and an accumulator connected to said bypass passage capable of accommodating a change in the capacity of one of the chambers due to a piston rod extending from the piston out of the cylinder when the pressures of the two chambers are at the level near the atmospheric pressure. Alternatively, the accumulator could be replaced with a storage container connected to the bypass passage capable of accommodating an amount of actuating oil corresponding to a capacity of the cylinder.

According to the above mentioned structure including the accumulator, even when a hydraulic pump is not operative and the supply of the actuating oil is discontinued, the change in the capacity of the one of piston chambers accounted for by the cubic volume of the piston rod, which is caused by the sliding movement of the piston rod in the cylinder, can be effectively removed by the accumulator under a slightly pressurized condition of the hydraulic actuator, and the damping force can be produced by the flow restricting means provided in the oil passage communicating the two piston chambers with each other. According to the second structure including the storage container, even when the actuation oil is entirely removed by the piston moving to an extreme point of its stroke, the loss of the oil can be recovered by the oil in the storage container provided in the oil passage communicating the two piston chambers with each other, and the damping force can be ensured even when the suspension system is not able to serve as an active suspension system due to the loss of pressure supply or other reason.

BRIEF DESCRIPTION OF THE DRAWINGS

Now the present invention is described in the following with reference to the appended drawings, in which.

DETAILED DESCRIPTION OF THE PREFERRED EMBODIMENT

Figure 1:
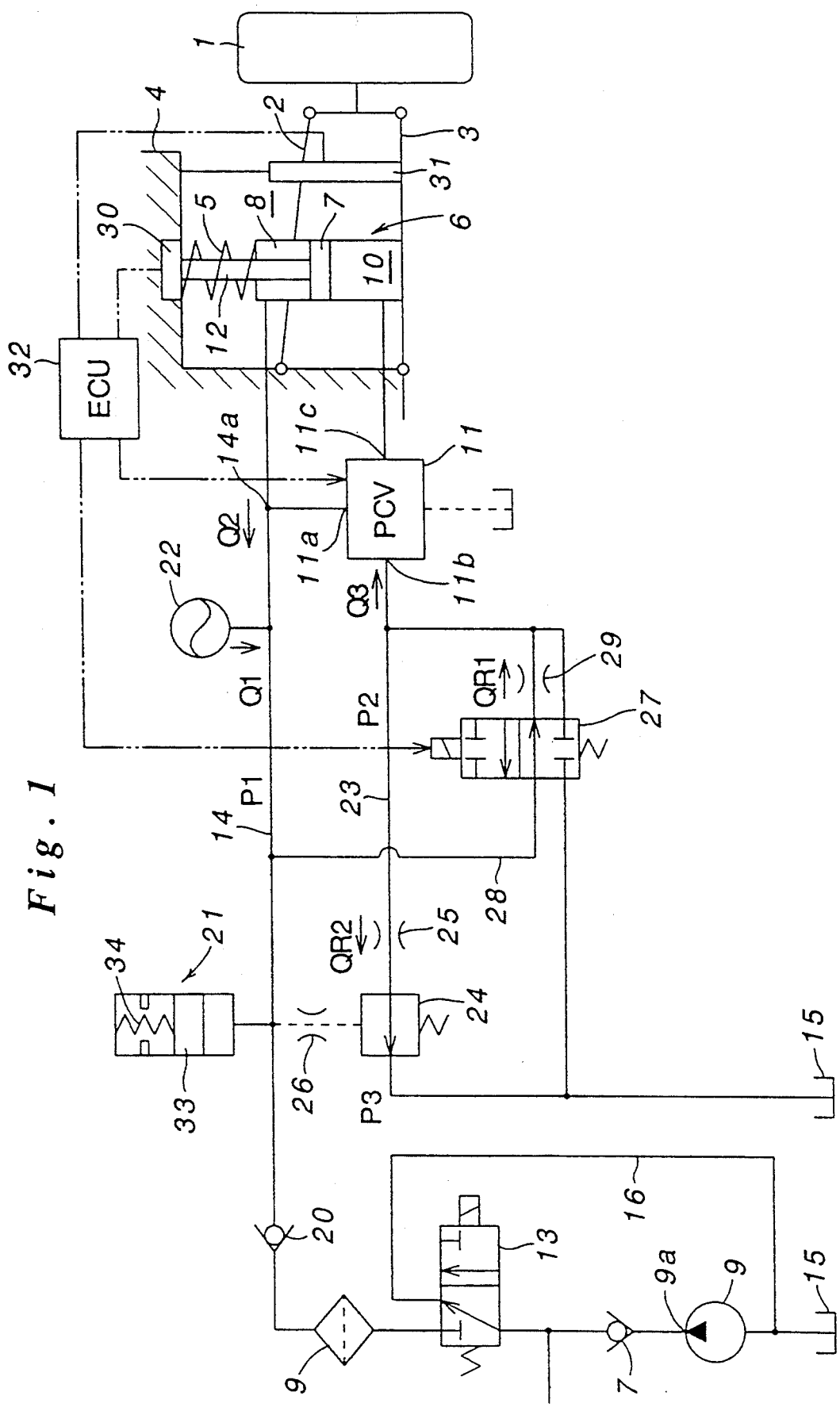
FIG. 1 is an overall circuit diagram of a first embodiment of the hydraulic control circuit for an active vehicle suspension system according to the present invention.

FIG. 1 shows the outline of the hydraulic circuit of a first embodiment of the hydraulic control circuit for an active vehicle suspension system according to the present invention. A wheel 1, which is movable in the vertical direction relative to a vehicle body 4, is supported by an upper suspension arm 2 and a lower suspension arm 3. A compression coil spring 5 and a hydraulic actuator 6 are connected between the lower suspension arm 3 and the vehicle body 4 in parallel with each other.

The hydraulic actuator 6 is of a cylinder/piston type, in which actuating oil fed from a variable displacement hydraulic pump 9 is directly supplied to an upper piston chamber 8 defined by a piston 7 slidably received in a cylinder in an upper part of the cylinder, and the actuating oil, which is controlled by a control valve 11, is also supplied to a lower oil chamber 10 defined below the piston 7. A piston rod 12 is connected to the piston 7 and extends from an upper end of the cylinder. The piston rod 12 thus produces a thrust as determined by the two pressure receiving surfaces of the piston 7 facing the two piston chambers 8 and 10, and the pressures existing in the two piston chambers 8 and 10 so as to change the relative distance between the wheel 1 and the vehicle body 4. The areas of the pressure receiving surfaces of the piston 7 facing the upper and lower chambers 8 and 10 are different from each other by the cross sectional area of the piston rod 12.

An outlet port 9a of the hydraulic pump 9 is communicated with an oil supply passage 14 via an unloader valve 13. The oil supply passage 14 is branched off into two directions at a branching point 14a located at its downstream end, and one of the branched passages is communicated with the upper piston chamber 8 while the other branched passage is connected to an input port 11a of a pressure control valve (PCV) 11.

The unloader valve 13 consists of a spring offset type directional control solenoid valve which communicates the output port 9a of the hydraulic pump 9 with a reservoir tank 15 via am unloader oil passage 16 when the solenoid is de-energized, and communicates the output port 9a of the hydraulic pump 9 with the oil supply passage 14 instead of the unloader oil passage 16 when the solenoid is energized.

A check valve 17 for allowing the flow only from the output port 9a to the unloader valve 13 is connected therebetween, and an accumulator 18 for removing ripples from the pump output is connected to the downstream end of this check valve 17. A strainer 19 and a check valve 20 for allowing the flow only from the unloader valve 13 to the branching point 14a is connected in series between the unloader valve 13 and the oil supply passage 14. A low pressure accumulator 21 for accounting for the displacement of the oil by the piston rod 12 in the upper chamber 8 as the piston 7 is moved as described hereinafter as well as a normal accumulator 22 for flow rate compensation are also connected to the oil supply passage 14. The output pressure of the hydraulic pump 9 is maintained at a fixed level by a pressure regulating valve not shown in the drawings.

The pressure control valve 11 provided between the oil supply passage 14 and the lower piston chamber 10 communicates the reservoir tank 15 with the lower piston chamber 10 through an oil return passage 23 when its solenoid is de-energized, and controls the pressure of the actuating oil in the lower piston chamber 10 by changing the degree of communication between the oil supply passage 14 and the lower piston chamber 10 in accordance with the value of the electric current supplied to the solenoid when the solenoid is energized.

A balance valve 24, which is opened by a balance between a pressure from the oil supply passage 14 and a preset pressure determined by a spring force of the spring shown at the bottom of the valve 24, and a relief orifice 25, which controls the flow rate of relief oil, are connected in series in the return oil passage 23. A buffer orifice 26 is provided at the control input end of the balance valve 24 for controlling the excessive response of the balance valve 24.

A switch valve 27, which can selectively switch over the communication of the return passage 23 with the oil supply passage 14 and the reservoir tank 15 is connected to a return port 11b of the pressure control valve 11. When the return passage 23 is communicated with the oil supply passage 14, the balance valve 24 is bypassed. This switch valve 27 is a spring offset type solenoid control valve which communicates the return port 11b of the pressure control valve 11 with the oil supply passage 14 when the solenoid is de-energized, and directly communicates the return port 11b of the pressure control valve 11 with the reservoir tank 15 when the solenoid is energized. A damper orifice 29 is provided in a bypass oil passage 28 which communicates the oil supply passage 14 with the return port 11b of the pressure control valve 11 when the solenoid of the switch valve 27 is de-energized for producing a damping force by applying a resistance to the oil flowing between the upper piston chamber 8 and the lower piston chamber 10 as described hereinafter.

A load sensor 30 is provided between the hydraulic actuator 6 and the vehicle body 4, and a stroke sensor 31 is provided between the lower suspension arm 3 and the vehicle body 4 to generate signals which are supplied to an electric control circuit 32 for controlling the energization of the solenoids of the pressure control valve 11 and the switch valve 27.

Now the operation of the above mentioned embodiment is described in the following.

Under the normal control mode (when the engine is operating), the output port 9a of the hydraulic pump 9 is communicated with the oil supply passage 14 by the unloader valve 13, and the return port 11b of the pressure control valve 11 is communicated with the reservoir tank 15 by the switching valve 27. The pressure from the hydraulic pump 9 is thus fed to the upper piston chamber 8 and to the input port 11a of the pressure control valve 11 via the branching point 14a of the oil supply passage 14. According to this structure, therefore, the normal active suspension control is accomplished so as to control the change in the relative distance between the wheel 1 and the vehicle body 4 by changing the value of the current supplied to the solenoid of the pressure control valve 11 and controlling the pressure of the actuating oil supplied to the lower piston chamber 10, thus producing a required stroke of the piston rod 12 of the actuator 6.

In the hydraulic actuator 6 of this embodiment, the area of the oil receiving surface of the piston 7 facing the lower chamber 10 is larger than that facing the upper chamber 8. Further, normally, the pressure from the pump 9 is directly fed to the upper piston chamber 8. Therefore, when the pressure in the upper piston chamber 8 is equal to that in the lower piston chamber 10, an upward thrust is produced in the piston rod 12 so as to increase the distance between the wheel 1 and the vehicle body 4. When the internal pressure in the lower piston chamber 10 is reduced, the thrust is diminished so as to reduce the distance between the wheel 1 and the vehicle body 4. In short, a desired stroke of the piston rod 12 of the hydraulic actuator 6 can be produced simply by controlling the increase and decrease of the hydraulic oil to the lower piston chamber 10. The thrust produced by the hydraulic actuator 6 is basically feedback controlled by the output value of the load sensor 30 for detecting the reaction of the hydraulic actuator 6 to the vehicle body 4 and/or by an output from the stroke sensor 31 for detecting the relative distance between the vehicle body 4 and the wheel 1 by using a target value associated with a predetermined spring force and damping force.

On the other hand, immediately after the engine is started or when the pressure in the oil supply passage 14 has abnormally increased, the energization of the solenoid of the unloader valve 13 is terminated so that the load of the pump may be reduced by forming a bypass passage between the output port 9a of the hydraulic pump 9 and the reservoir tank 15.

When the engine is not operated, the solenoid of the unloader valve 13 as well as the solenoid of the switching valve 27 are de-energized so that the oil supply passage 14 is disconnected from the hydraulic pump 9 and the reservoir tank 15, and communicated with the oil return passage 23. At the same time, the solenoid of the pressure control valve 11 is also de-energized, and this causes its return port 11b to be communicated with its output port 11c with the result that the upper piston chamber 8 and the lower piston chamber 10 are communicated with each other via the damper orifice 29, and the lower chamber 10 is communicated with the reservoir tank 15 via the relief orifice 25. The pressures in the both piston chambers 8 and 10 are thus gradually relieved through the relief orifice 25 according to the balance between the preset pressure of the balance valve 24 and the pressure of the oil supply passage 14 or the internal pressure of the upper piston chamber 8.

Since the oil is non-compressive, for the hydraulic actuator 6 to be kept immobile in spite of external forces, the flow rates Q2 and Q3 to the piston chambers 8 and 10 are required to be both zero. Therefore, the flow rate QR2 of the relief orifice 25, and the flow rate QR1 of the damper orifice 29 or the flow rate at the balance valve 24 are both equal to the flow rate Q1 from the accumulator 22 for flow rate compensation purpose.

Thus, the following relations hold:

$$P1 - P2 = C1 \ QR1 = C1 \ Q1$$

$$P2 - P3 = C2 \ QR2 = C2 \ Q1 \tag{1}$$

where

C2 is a proportion factor for the pressure loss at the relief orifice for a given flow rate;

C1 is a proportion factor for the pressure loss at the damper orifice for a given flow rate;

P1 is an internal pressure of the upper piston chamber 8;

P2 is an internal pressure of the lower piston chamber 10; and

P3 is the pressure at the output end of the balance valve 24.

When there is no pressure loss downstream of the relief orifice 25, since the output end of the balance valve 24 is at the atmospheric pressure (zero), the following relations can be obtained from Equation (1):

$$P1 = (C1 + C2)Q1$$

$$P2 = C2 \ Q1 \tag{2}$$

Now, for the relative relationship

P1:P2, the values of equation (2) can be substituted to achieve the equivalent relationship $$= (C1 + C2) : C2 \tag{3}$$
$$= 1 / A1 : 1 / A2$$

which must hold for the piston 7 to be immobile, where A1 is the area of the pressure receiving surface of the piston 7 facing the upper piston chamber 8, and A2 is the area of the pressure receiving surface of the piston 7 facing the lower piston chamber 10. Thus, by selecting C1, C2, A1 and A2 such that the following relative relationship is achieved $$C1:C2 = 1/A1 - 1/A2:1/A2 \tag{4}$$

it is possible to prevent any stroke to be produced by the hydraulic actuator 6 because the internal pressure P1 of the upper piston chamber 8 and the internal pressure P1 of the lower piston chamber 10 are gradually relieved by maintaining the pressures P1 and P2 to be inversely proportional to the corresponding areas of the pressure receiving surfaces A1 and A2 facing the upper and lower piston chambers 8 and 10, respectively.

When the unloader valve 13 is de-energized to disconnect the oil supply passage 14 from the pump 9, the internal pressure P1 of the upper piston chamber 8 is gradually relieved and reaches the value of the preset pressure α (gauge pressure) of the balance valve 24, the balance valve 24 is then closed and the hydraulic circuit is enclosed under a pressurized condition which is slightly higher than the atmospheric pressure or at the atmospheric pressure + α. Thus, the oil passage between the two piston chambers forms a closed loop. By setting the spring constant of a biasing spring 34 of the low pressure accumulator 34 so as to place the piston 33 approximately at the center in this condition, the change in the volume of the upper piston chamber 8 by the volume displaced by the piston rod 12 is accommodated by the movement of the piston 33 in the low pressure accumulator 21 as the hydraulic actuator 6 undergoes an extending and retracting movement. Furthermore, since the pressure in the closed loop hydraulic circuit formed between the upper and lower chambers 8 and 10 of the hydraulic actuator 6 is higher than the atmospheric pressure by the preset pressure α, a passive damping force is produced as the oil flows through the damper orifice 29 in the bypass oil passage 28.

Figure 2:
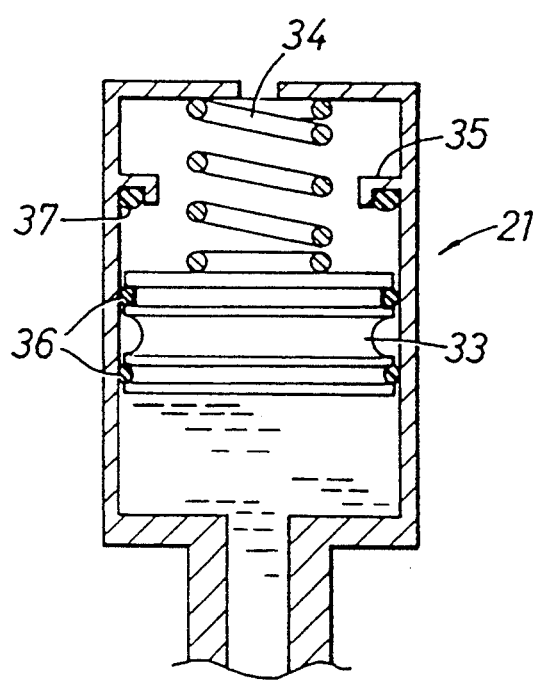
FIG. 2 is a simplified sectional view of an accumulator for compensating for the volume of the piston rod.

As shown in FIG. 2, since the low pressure accumulator 21 employs a spring-loaded piston 33, and the normal pressure range is near the atmospheric pressure, the piston 33 is normally kept immobile by a stopper 35 when the normal operating pressure is applied thereto. However, when the closed loop hydraulic circuit is placed under the slightly pressurized condition, the piston 33 is movable involving very little friction because the piston 33 is sealed by low pressure seals 36 provided on the piston 33. On the other hand, when the normal operating pressure is supplied from the hydraulic pump 9, the piston 33 is caused to adhere to a high pressure seal 37 provided on the stopper 35. Therefore, in the normal operating condition, the high pressure seal 37 ensures that presence of the low pressure accumulator 21 would not impair the favorable performance of the system.

Figure 3:
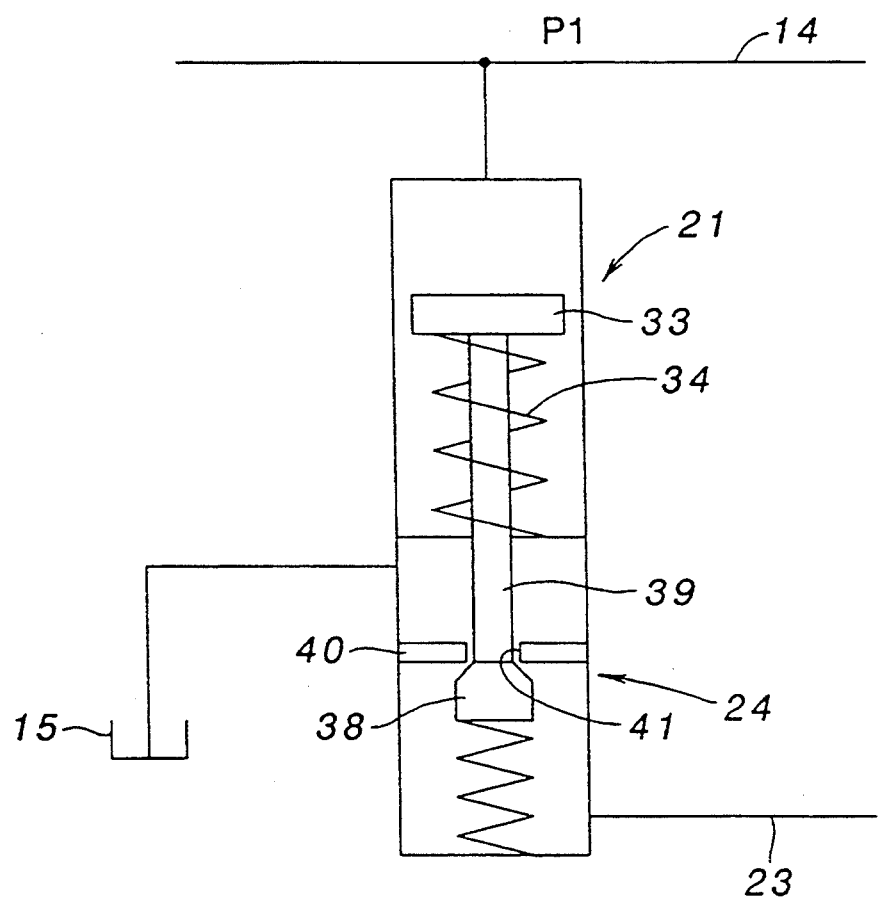
FIG. 3 is a schematic view of a modified embodiment of the accumulator for compensating for the volume of the piston rod.

As shown in FIG. 3, the balance valve 24 may be internally incorporated with the low pressure accumulator 21. According to this structure, when the internal pressure P1 in the upper piston chamber 8 is higher than a prescribed level, the piston 33 will be located lower than the center of the entire stroke of the piston 33 by virtue of the balance between the spring force of the spring 34 and the internal pressure P1. In this condition, the return oil passage 23 is communicated with the reservoir tank 15 because a popper 38 of the balance valve 24 is pushed down by a rod 39 which is integral with the piston 33, and a communication opening 41 of a central partition wall 40 is opened up. When the internal pressure of the upper piston chamber 8 is gradually relieved and falls below the prescribed level, the hydraulic circuit is sealed off under a slightly pressurized condition or at a pressure higher than atmospheric pressure by the preset pressure $\alpha$ because the piston 33 moves upward by the spring force of the spring 34 and the communication opening 41 of the central partition wall 40 is closed by the poppet 38.

Figure 4:
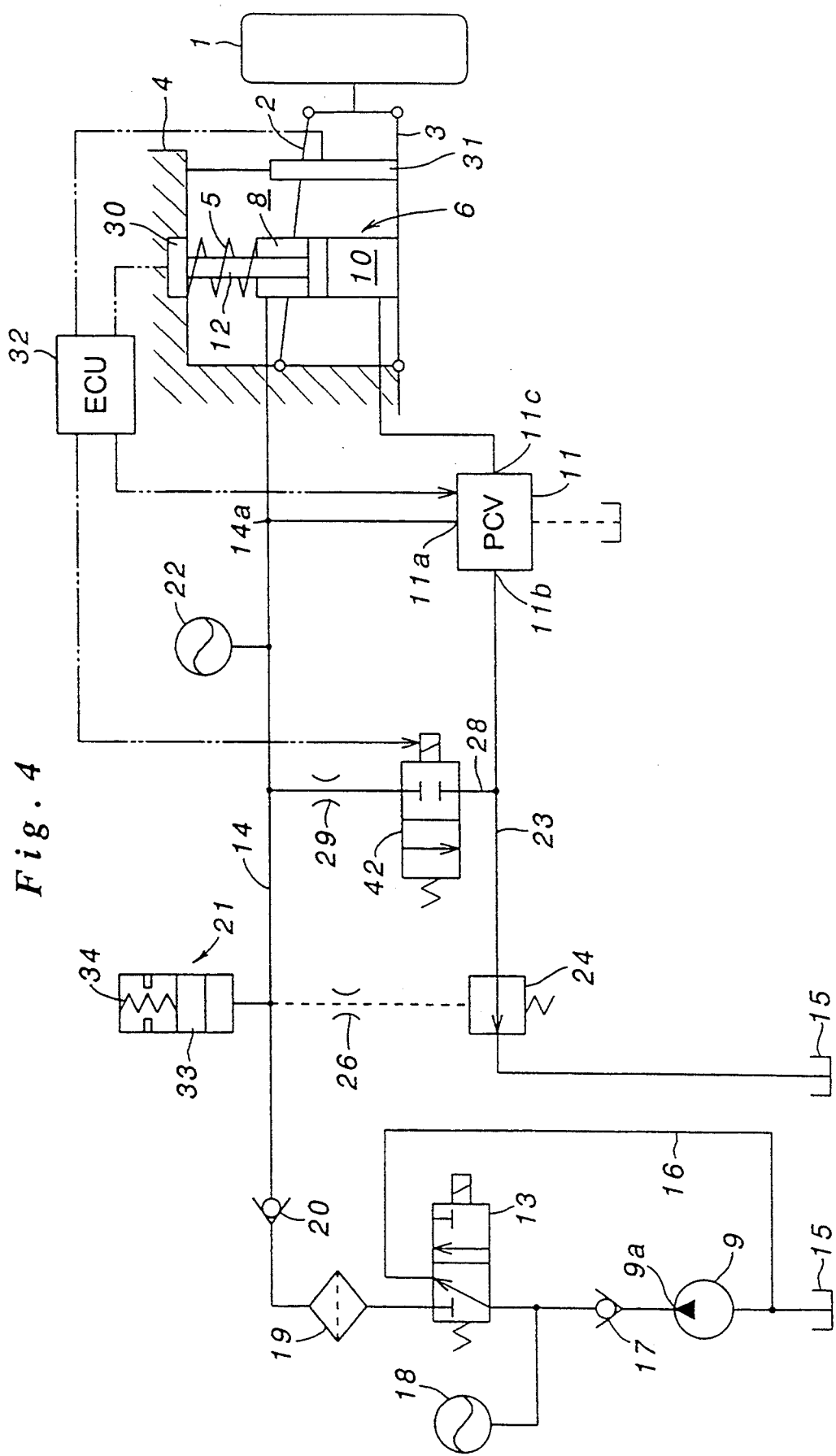
FIG. 4 is a view similar to FIG. 1 showing a second embodiment of the hydraulic control circuit for an active suspension system according to the present invention.

FIG. 4 shows a second embodiment of the present invention. In the description of the several embodiments in this application, like parts are denoted with like numerals, and the detailed descriptions of previously described parts are omitted. In this embodiment, the bypass passage 28 bypassing the hydraulic circuit between the oil supply passage 14 and the oil return passage 23 is provided with a damper orifice 29 and a solenoid control valve 42. Under the normal mode, the same control as in the first embodiment described above is carried out by the closing of the solenoid control valve 42. When the engine is not operating, however, the solenoids of the unloader valve 13 and the control valve 42 are de-energized at the same time as the solenoid of the pressure control valve 11 is de-energized so that the supply of the hydraulic oil to the hydraulic actuator 6 is discontinued and the oil supply passage 14 is communicated with the return oil passage 23. Therefore, the pressures in the two piston chambers 8 and 10 are gradually relieved in accordance with the balance between the internal pressure of the upper piston chamber 8 and the preset pressure of the balance valve 24 in same way as the above mentioned first embodiment. After the hydraulic oil circuit is sealed off under a pressure higher than the atmospheric pressure by the preset pressure $\alpha$, the movement of the piston 33 of the low pressure accumulator 21 accommodates the change in the volume of the upper piston chamber 8 caused by the displacement of the actuating oil by the piston rod as the hydraulic actuator 6 undergoes an expanding and contracting movement. Further, a passive damping force is produced as the oil is passed through the damper orifice 29 of the bypass passage 28.

Figure 5:
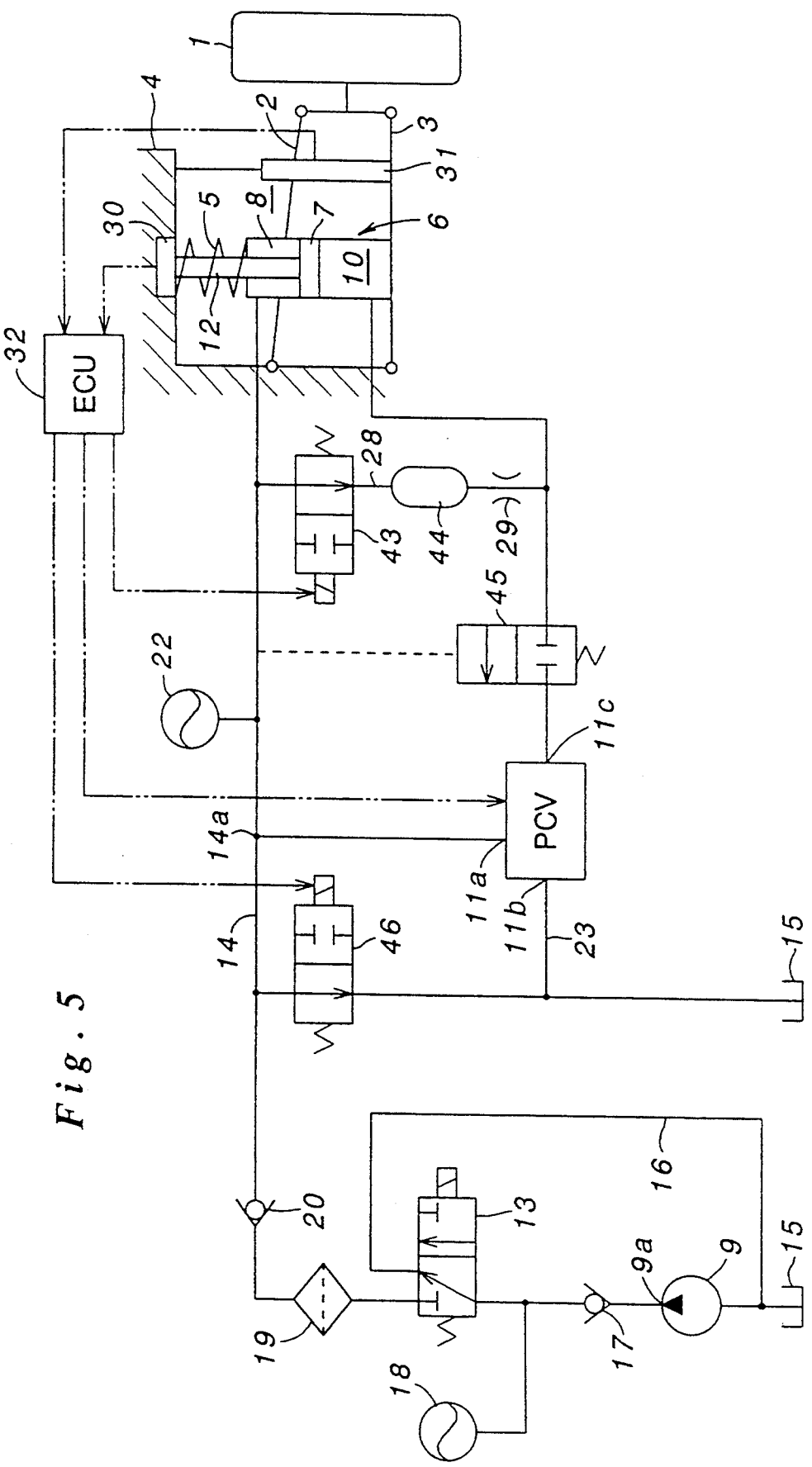
FIG. 5 is a view similar to FIG. 1 showing a third embodiment of the hydraulic control circuit for an active suspension system according to the present invention.

FIG. 5 shows a third embodiment of the present invention. In this embodiment, a first solenoid control valve 43, a storage container 44 and the damper orifice 29 are provided in series in the bypass passage 28 connecting the upper piston chamber 8 with the lower piston chamber 10. A pressure responsive solenoid control valve 45 responding to the pressure from the upper piston chamber 8 is provided between the lower piston chamber 10 and the output port 11c of the pressure control valve 11. A second solenoid control valve 46 is provided between the oil supply passage 14 and the oil return passage 23.

Under the normal mode of the hydraulic oil circuit of this embodiment, only the pressure responsive solenoid control valve 45 is opened by the pressure of the supply oil passage 14 whereas the first and second solenoid control valves 43, 46 are kept closed. Therefore, the stroke of the hydraulic actuator 6 can be controlled in the same way as the above mentioned first and second embodiments by controlling the pressure of the lower piston chamber 10 with the pressure control valve 11.

When a fail-safe action takes place, or when the output pressure is lost for any reason, the first and second solenoid control valves 43 and 46 are both opened, but the pressure of the accumulator 22 for flow rate compensating purpose, namely, the pressure of the upper piston chamber 8 is allowed to be gradually relieved by setting the flow rates at the return port 11b of the pressure control valve 11 and the damper orifice 29 to be substantially equal to each other. When the pressure of the upper piston chamber 8 reaches the approximate level of the atmospheric pressure, the pressure responsive solenoid control valve 45 is closed, and the lower piston chamber 10 is sealed off at the level of the atmospheric pressure. In this embodiment, because the internal pressure of the upper piston chamber 8 is ultimately opened to the atmosphere, the actuating oil may completely flow out when the hydraulic actuator 6 is fully extended. The damping force, however, can be produced, by keeping the capacity of the storage container 44 approximately equal to the effective capacity of the hydraulic actuator 6, when the actuating oil is passed between the storage container 44 and the lower piston chamber 10 via the damper orifice 29 as the hydraulic actuator 6 undergoes the expanding and contracting movement.

According to a first aspect of the present invention, because the hydraulic actuator can be placed under a slightly pressurized condition after relieving the internal pressures of the upper and lower piston chambers, the change in the capacity of the piston chamber due to the cubic volume of the piston rod which is caused by the sliding movement of the piston rod in the cylinder can be removed by the accumulator having an operating pressure range substantially lower than the normal operating pressure. According to a second aspect of the present invention, the undesirable loss of the actuating oil can be avoided by storing the oil in the storage container even when the oil in one of the piston chambers is expelled to the reservoir tank. In either case, a passive damping force is produced by the actuating oil passing through a damper orifice. Therefore, a fail-safe feature for the active suspension system can be obtained for improved reliability of the system. Further, an economic advantage can be gained by intentionally placing the active suspension system in a state of a passive damper, or in other words because the active suspension system may also function as a passive damper.

Although the present invention has been described in terms of specific embodiments, it is possible to modify and alter details thereof without departing from the spirit of the present invention.

What we claim is:

1. A hydraulic control device for an active suspension system employing a pressure source, and a linear hydraulic cylinder including a piston connected in parallel with a spring between a wheel and a vehicle body, said piston having two pressure receiving surfaces of different areas facing two chambers separated by said piston in said cylinder, said hydraulic control device comprising:
   conduit means for supplying output pressure from said pressure source substantially continuously and directly to one of said two chambers corresponding to a smaller one of said pressure receiving surfaces of said piston during normal operation of the pressure source;
   a control valve connected between said pressure source and the other of said two chambers for controlling the pressure in said other chamber to allow said chamber to operate as a powered actuator for said active suspension system;
   means for reducing the pressures of said two chambers to a level near the atmospheric pressure when the operation of the pressure source becomes abnormal;
   switch valve means provided in a bypass passage between said two chambers for selectively communicating said two chambers with each other;
   flow restricting means provided in said bypass passage; and
   a storage container connected to said bypass passage capable of accommodating an amount of actuating oil corresponding to a capacity of said cylinder.

2. A hydraulic control device according to claim 1, wherein said pressure reducing means is adapted to gradually reduce the pressures of said two chambers to a level near atmospheric pressure.

3. A hydraulic control device according to claim 1, wherein said hydraulic control device further comprises an accumulator connected to said conduit means for compensating a flow rate of the output pressure from the pressure source, said accumulator remaining in communication with said hydraulic cylinder when said pressure reducing means is reducing the pressures of said two chambers.

4. A hydraulic control device for an active suspension system employing a pressure source, and a linear hydraulic cylinder including a system connected in parallel with a spring between a wheel and a vehicle body, said piston having two pressure receiving surfaces of different areas facing two chambers separated by said piston in said cylinder, said hydraulic control device comprising:
   conduit means for supplying output pressure from said pressure source substantially continuously and directly to one of said two chambers corresponding to a smaller one of said pressure receiving surfaces of said piston during normal operation of the pressure source;
   a control valve connected between said pressure source and the other of said two chambers for controlling the pressure in said other chamber to allow said hydraulic cylinder to operate as a powered actuator for said active suspension system;
   means for reducing the pressures of said two chambers to a level near the atmospheric pressure when operation of the pressure source becomes abnormal;
   switch valve means provided in a bypass passage between said two chambers for selectively communicating said two chambers with each other;
   flow restricting means provided between one of said chambers and said switch valve means; and
   an accumulator connected to said bypass passage capable of accommodating a change in the capacity of one of said chambers due to a piston rod extending from said piston out of said cylinder when the pressures of said two chambers are at said level near the atmospheric pressure.

5. A hydraulic control device for an active suspension system according to claim 4, wherein said accumulator is provided with a spring-loaded piston, a stopper on which said piston abuts when said accumulator is subjected to a normal operating pressure of said active suspension system, and seal means provided between said piston and said stopper for preventing escape of actuating oil from said accumulator when said normal operating pressure is applied thereto.

6. A hydraulic control device according to claim 4, wherein said pressure reducing means is adapted to gradually reduce the pressures of said two chambers to a level near atmospheric pressure.

7. A hydraulic control device according to claim 4, wherein said hydraulic control device further comprises a main accumulator connected to said conduit means for compensating a flow rate of the output pressure from the pressure source, said main accumulator remaining in communication with said hydraulic cylinder when said pressure reducing means is reducing the pressures of said two chambers.

8. A hydraulic control device according to claim 4, wherein said device further comprises means for forming a closed loop between said two piston chambers once the chamber pressures are reduced to the level near atmospheric pressure.

9. A hydraulic control device according to claim 4, wherein said accumulator is capable of fully accommodating any change in the capacity of one of said chambers due to the piston rod extending from said piston out of said cylinder when the pressures of the two chambers are at said level near the atmospheric pressure.

10. A hydraulic control device for an active suspension system employing a pressure source, and a linear hydraulic cylinder including a piston connected in parallel with a spring between a wheel and a vehicle body, said piston having two pressure receiving surfaces of different areas facing two chambers separated by said piston in said cylinder, said hydraulic control device comprising:
   conduit means for supplying output pressure from said pressure source substantially continuously and directly to one of said two chambers corresponding to a smaller one of said pressure receiving surfaces of said piston during normal operation of the pressure source;
   a control valve connected between said pressure source and the other of said two chambers for controlling the pressure in said other chamber to allow the hydraulic cylinder to operate as a powered actuator for said active suspension system;

means for reducing the pressures of said two chambers to a level near the atmospheric pressure when operation of the pressure source becomes abnormal;

switch valve means provided in a bypass passage between said two chambers for selectively communicating said two chambers with each other;

flow restricting means provided between one of said chambers and said switch valve means; and fluid accommodating means connected to said bypass passage for accommodating a change in the capacity of at least one of said chambers when the pressures of said chambers are at said level near the atmospheric pressure.

11. A hydraulic control device according to claim 10, wherein said fluid accommodating means comprises an accumulator connected to said bypass passage capable of accommodating a change in the capacity of one of said chambers due to a piston rod extending from said piston out of said cylinder when the pressures of said two chambers are at said level near the atmospheric pressure.

12. A hydraulic control device according to claim 10, wherein said fluid accommodating means comprises a storage container connected to said bypass passage capable of accommodating an amount of actuating oil corresponding to a capacity of said cylinder.

13. A hydraulic control device according to claim 10, wherein said hydraulic control device further comprises an accumulator connected to said conduit means for compensating a flow rate of the output pressure from the pressure source, said accumulator remaining in communication with said hydraulic cylinder when said pressure reducing means is reducing the pressures of said two chambers.

14. A hydraulic control device according to claim 10, wherein said device further comprises means for forming a closed loop between said two piston chambers once the chamber pressures are reduced to the level near atmospheric pressure.

15. A hydraulic control device according to claim 10, wherein said fluid accommodating means is capable of fully accommodating any change in the capacity of one of said chambers due to the piston rod extending from said piston out of said cylinder when the pressures of the two chambers are at said level near the atmospheric pressure.

16. A hydraulic control device for an active suspension system employing a pressure source, a linear hydraulic cylinder including a piston connected in parallel with a spring between a wheel and a vehicle body, said piston having two pressure receiving surfaces of different areas facing two chambers separated by said piston in said cylinder, conduit means for supplying output pressure from said pressure source substantially directly to one of said two chambers corresponding to a smaller one of said pressure receiving surfaces of said piston, and a control valve connected between said pressure source and the other of said two chambers for controlling the pressure in said other chamber to allow said hydraulic cylinder to operate as a powered actuator for said active suspension system, said hydraulic control device comprising:

means for reducing the pressures of said two chambers to a level near the atmospheric pressure;

switch valve means provided in a bypass passage between said two chambers for selectively communicating said two chambers with each other;

flow restricting means provided in said bypass passage;

a storage container connected to said bypass passage capable of accommodating an amount of actuating oil corresponding to a capacity of said cylinder; and said pressure reducing means being adapted to gradually open at least one of said two chambers to the atmosphere.

* * * * *